United States Patent
Osagawa et al.

[11] 3,942,965
[45] Mar. 9, 1976

[54] PROCESS FOR PRODUCING A GAS TIGHT LIGHT TRANSMITTING OPTICAL FIBER PLATE

[75] Inventors: Masaaki Osagawa; Kunimitsu Kobayashi; Kenji Nakagawa, all of Saitama, Japan

[73] Assignee: Hoya Glass Works, Ltd., Tokyo, Japan

[22] Filed: June 17, 1974

[21] Appl. No.: 480,448

[30] Foreign Application Priority Data
June 15, 1973 Japan.............................. 48-67601

[52] U.S. Cl..................... 65/4 B; 65/13; 65/DIG. 7; 264/1
[51] Int. Cl.² ......................................... C03B 37/02
[58] Field of Search......... 65/4, DIG. 7, 13, 12, 4 B; 264/1

[56] References Cited
UNITED STATES PATENTS

| | | | |
|---|---|---|---|
| 3,224,851 | 12/1965 | Hicks | 65/4 |
| 3,625,669 | 12/1971 | Norton | 65/4 |
| 3,669,639 | 6/1972 | Inoue et al. | 65/DIG. 7 |

*Primary Examiner*—Robert L. Lindsay, Jr.
*Attorney, Agent, or Firm*—Sughrue, Rothwell, Mion, Zinn & Macpeak

[57] ABSTRACT

A process for producing a gas tight light transmitting optical fiber plate comprising arranging the optical fibers or bundles of the optical fibers in a die, heating and compressing the optical fibers at a temperature of between the transition point of the glass of the optical fibers and the softening point of the glass of the optical fibers thereby to weld the optical fibers together, and maintaining the welded optical fibers within that temperature range at a pressure higher than the pressure during the heating period which is sufficient to cause the shrinkage of voids by the surface tension of the optical fibers.

2 Claims, No Drawings

PROCESS FOR PRODUCING A GAS TIGHT LIGHT TRANSMITTING OPTICAL FIBER PLATE

BACKGROUND OF THE INVENTION

1. Field of the Invention

This invention relates to a gas tight light transmitting optical fiber plate and, more particularly, to a process for producing a gas tight light transmitting optical fiber plate.

2. Description of the Prior Art

A highly gas tight light transmitting optical plate, which is used for the face plate of a cathode ray tube, is usually produced by arranging glass fibers or bundles of glass fibers, which are coated with a layer of a glass having a low refractive index, in a die, and compressing the arranged glass fibers at a high temperature to fill the voids between neighboring glass fibers. For producing a light transmitting optical plate having a high vacuum tightness, a high compression must be applied to the glass fibers at a high temperature. This often causes fins or projections from the side faces of the die, thus resulting in an increase in the cost of the light transmitting plate.

In addition, if the voids in the glass fiber bundles are closed, the closed voids are merely stretched in the axial direction of the fibers even with a high compression. Accordingly, if the formed or welded glass fiber product is cut along a plane perpendicular to the axial direction of the glass fiber, cylindrical voids having open ends often result in the product, thus decreasing its vacuum tightness. Furthermore, the conventional process, which includes the step of mechanically compressing the glass fiber bundles at a high temperature, bends and distorts the glass fiber bundles and results in a reduction in the resolving power of the cathode ray tube product obtained.

Another conventional process for producing light transmitting optical fiber plate comprises heating the bundles of the glass fibers surrounded by a material which has a low degree of expansion to a temperature at which the glass fibers are fluidized, causing a high static pressure in the fiber bundles due to the thermal expansion thereof, and thereby forcedly sealing the voids to form vacuum tight glass bundles. This process, however, is not economical and requires intricate apparatus.

SUMMARY OF THE INVENTION

Therefore, an object of this invention is to provide a light transmitting optical fiber plate having a high vacuum tightness and few cloudy spots (low light transmitting spots) with high yield.

This invention provides a process for producing a light transmitting plate comprising arranging optical fibers or bundles of optical fibers in a die, heating and compressing the optical fibers at a temperature ranging between the transition point of the optical fiber glass and the softening point of the optical fiber glass to weld the optical fibers together and maintaining the welded optical fibers at that temperature range.

DETAILED DESCRIPTION OF THE INVENTION

The generation of cloudy spots results from a spheroidizing of the void between the fiber bundles. A large void greatly distorts the glass fibers and prevents transmission of light. This causes dark spots on the transmitted image. To eliminate the formation of cloudy spots, the optical fibers or the bundles of the optical fibers are heated and compressed, and then maintained at the desired temperature range for some period of time.

One feature of this invention is that the compression of the fibers or fiber bundles can be reduced according to the process of this invention as compared with the conventional process in which the vacuum tightness is formed only by compression on the fibers or the fiber bundles, thus reducing fin formation, resulting in a high yield and making the production of a large sized light transmitting optical fiber plate possible.

The voids caused in the optical fiber bundles or between the optical fiber bundles when arranged in a die are compressed for shrinking at a temperature range in which the optical fibers are fluidized, the compression is released when the diameter of the void is reduced below a predetermined value, e.g., below about 1 $\mu$, and the optical fibers are maintained at the desired temperature for some period of time. This invention has been accomplished on a discovery that after the voids are shrunk by compression to a predetermined value, the rate of the shrinking of the void diameter is dependent on the surface tension of the glass itself rather than the external pressure.

Another feature of this invention is that vacuum tightness can be obtained where the optical fibers are cut in a plane perpendicular to the axial direction of the fiber.

The void elongated between the optical fibers or the optical fiber bundles is spheroidized by maintaining the optical fibers at a temperature higher than the welding temperature for a predetermined period of time and increasing the pressure to a level higher than that during the heating period.

Where the spheroidized void is large, however, the optical fibers near the void are deformed and the light permeability is reduced. This causes a cloudy spot. Accordingly, the optical fibers are preferably heated and welded under reduced compression e.g., less than about 10 Torr, for removing the gasses in the voids caused when the optical fibers or the bundles are arranged in the die, gasses generated from the glass itself, and gasses released from the optical fiber surfaces. Where the reduced pressure is greater than 10 Torr, cloudy spots are frequently formed. On the other hand, the formation of cloudy spots is reduced in accordance with a pressure reduction below 10 Torr. Therefore, the pressure is preferably not higher than 1 Torr. Since the gasses are generated from the glass at an elevated temperature, the glass fibers are preferably heated and degassed at a temperature slightly lower than the temperature at which the optical fibers are softened and deformed to seal the voids, and the welded optical fibers are fully evacuated at that temperature for a period of time and also during the cooling period down to the welding temperature.

The temperature at which the optical fibers are compressed preferably ranges from the transition point of the optical fiber glass to the softening point thereof. If the heating temperature is not higher than the transition point, the optical fibers are hardly fluidized and often are broken, and an extremely long period of time is required for shrinking the voids between the optical fiber bundles.

On the other hand, the softening and deformation of the optical fiber bundles are caused by heating the bundles at a temperature higher than the softening point, and accordingly, the optical fiber bundles are welded locally surrounding the voids and gasses from the glass itself are generated. Such optical fibers tend to have large sized spheroidal voids therein.

The preferable temperature used changes with the changes in the viscosity and forming pressure of the core glass and the viscosity and forming pressure of the coated glass, but the temperature preferably is a temperature at which the viscosity exhibited ranges from about $10^8$ to $10^{12}$ poise. Where the forming pressure is about 10 to 500 kg/cm$^2$ and the viscosity of the core glass is equal to the viscosity of the coated glass, the time required for welding at that temperature is several minutes to several hours. Where the viscosity of the core glass is different from the viscosity of the coated glass, the lower limit of the heating temperature is defined by the transition point of the higher viscosity glass, while the upper limit of the heating temperature is defined by the softening point of the lower viscosity glass.

The temperature and time period at which the glass is maintained to spheroidize the voids trapped in the optical fiber glass are selected suitably based on the change in the viscosity of the glass or the thickness of the light transmitting plate, but this temperature preferably ranges from the softening point of the optical fiber glass to the transition point of the optical fiber glass. Where the viscosity of the core glass is different from the viscosity of the coated glass, the upper limit of the temperature at which the glass fiber is maintained is defined by the softening point of the lower viscosity glass while the lower limit of the temperature at which the glass fiber is maintained is defined by the transition point of the higher viscosity glass. At the transition point, the rate of the reduction in the length of the void is extremely small and thus a very long period of time is required to shorten a void having a diameter of 1 $\mu$ and the length of 10 mm into a void having a length of 5 mm. If the temperature at which the glass fiber is maintained exceeds the softening point, the softening and deformation of the welded fiber bundles are undesirably caused. The temperature at which the glass fiber is maintained is preferably equal to the welding temperature or about 10° to 100°C higher than the welding temperature, since the viscosity at the temperature at which the glass fiber is maintained is about $10^{10}$ to $10^7$ poises and preferably slightly lower than that at the welding temperature for shortening the period of time for which the glass is maintained at this temperature. The period becomes shorter as the welding temperature is increased. For producing a vacuum tight light transmitting optical fiber plate having a thickness of 5 mm, the maintenance period is about 2 hours with a viscosity of about $10^8$ poises, where the size of the void is about 1 $\mu$.

The invention is applicable to a broad range of types of glasses and optical fibers produced therefrom. The only requirements with respect to the glass types and optical fiber types for the invention is that the processing types and conditions set forth herein be met for the type of glass and optical fiber used. An appropriate and preferred glass composition for the optical fiber is the use of a soda-lime glass as a clad glass and barium flint glass as a core glass.

The invention is further illustrated in greater detail by reference to the following examples. Unless otherwise indicated, all parts, percents, ratios and the like are by weight.

EXAMPLE 1

Optical fibers, each having a diameter of 1 mm, were produced by the "pipe rod process" using a soda-lime glass (transition point 525°C, softening point 680°C, refractive index 1.52) as the coating glass and a barium flint glass (transition point 575°C, softening point 690°C, refractive index 1.66) as the core glass. A rod of the optical fibers was formed to have a hexagonal cross section with 2 cm sides using these optical fibers. The light transmitting plate was formed by bundling the hexagonal rod according to the following process.

1. The optical fiber bundles were arranged in a metallic die having a cross section of 30 mm × 40 mm and a length of 40 mm, heated therein at 605°C while applying a pressure of 50 kg/cm$^2$ for the period of time necessary to reduce the starting cross section of the arranged optical fiber bundles to 70% of the starting cross section. Then, the compression was released, and the formed body was cooled slowly and cut into a thickness of 5 mm parallel to the end face. The plates obtained were ground and polished.

2. The optical fiber bundles were arranged in the same metallic die as described for process (1), and compressed using the same conditions as in process (1). After releasing the compression, the formed body was heated to 640°C for 4 hours, cooled slowly to room temperature (about 20°– 30°C), and cut into a thickness of 5 mm. The plates obtained were ground and polished.

The light transmitting optical fiber plates thus produced were subjected to testing for vacuum tightness using a herium leak detector. The light transmitting plate produced by process (1) exhibited a leak value of $1 \times 10^{-6}$ Torr cc He/sec, whereas the light transmitting plate produced by process (2) exhibited a leak value of less than $1 \times 10^{-10}$ Torr cc He/sec, and accordingly was completely vacuum tight. In addition, the number of cloudy spots of a size of more than 100 $\mu$ which prevented light transmission was 70 per 10 cm$^2$ area, according to a visual inspection of the light transmitting plate magnified 100 times using a magnifying glass.

EXAMPLE 2

A light transmitting plate was produced according to the following process using the same type of optical fiber bundles as described in Example 1.

1. Optical fiber bundles were arranged in a metallic die having a cross section of 30 mm × 40 mm and a length of 40 mm and heated in a reduced pressure furnace at 580°C while reducing the pressure to $10^{-4}$ Torr. Meanwhile, 100 kg/cm$^2$ of compression was applied to the optical fibers to reduce the starting cross section into about 80% thereof. Then, the compression was released, and the formed body was cooled slowly to room temperature and cut into a thickness of 5 mm. The plate obtained was ground and polished.

2. Optical fiber bundles were arranged in the same metallic die as described in process (1), and compressed using the same conditions as described in process (1). After releasing the compression, the formed body was heated to 660°C for 2 hours, cooled slowly to room temperature, and cut into a thickness of 5 mm. The plate obtained was ground and polished.

3. Optical fiber bundles were arranged in the same metallic die as described in process (1) and compressed using the same conditions as described in process (1). After releasing the compression, the pressure in the reducing furnace was reduced to 10 Torr, and the formed body was heated at 660°C for 2 hours. Then, the formed body was cooled slowly to room temperature and cut into a thickness of 5 mm. The plate obtained was ground and polished.

The number of cloudy spots of a size greater than 100 $\mu$ which prevented light transmission was inspected on the samples which were magnified 100 times using a magnifying glass. The light transmitting plate produced by process (2) exhibited 65 cloudy spots per 10 cm² of area, while the plate produced by process (3) exhibited 25 cloudy spots per 10 cm² of area.

EXAMPLE 3

The same type of optical fiber bundles as described in Example 1 were arranged in the same metallic die, and heated in the reduced pressure furnace at 620°C, while reducing the pressure in the furnace from 1 Torr to $10^{-5}$ Torr. Meanwhile, 50 kg/cm² of compression was applied to the optical fibers to reduce the starting cross section into about 70% thereof. After releasing the compression, the pressure in the furnace was increased to 760 Torr and the formed body was heated at 640°C for 4 hours. Then, the formed body was cooled slowly to room temperature and cut into a thickness of 5 mm. The plate obtained was ground and polished.

The vacuum tightness and the number of the cloudy spots of a size greater than 100 $\mu$ which prevented the transmission of the light were tested on these light transmitting plates in the same manner as described in Example 1. The test results obtained are shown in Table 1.

cut into a thickness of 5 mm. The light transmitting fiber plate obtained was ground and polished.

The vacuum tightness and the number of the cloudy spots of a size greater than 100 $\mu$ which prevented the transmission of the light were tested on these light transmitting plates in the same manner as described in Example 1. The test results obtained are shown in Table 2.

Table 2

| Sample | Welding Temp. (°C) | Pressure (kg/cm²) | Heating Temp. (°C) | Time (hour) | Vacuum Tightness (Torr cc He/sec) | Number of Cloudy Spots (per 10 cm² area) |
| --- | --- | --- | --- | --- | --- | --- |
| 1 | 560 | 500 | 600 | 24 | $<1 \times 10^{-10}$ | 7 |
| 2 | 590 | 200 | 620 | 8 | $<1 \times 10^{-10}$ | 6 |
| 3 | 640 | 50 | 650 | 3 | $<1 \times 10^{-10}$ | 8 |
| 4 | 680 | 10 | 680 | 0.5 | $<1 \times 10^{-10}$ | 10 |

As particularly described in the above Examples, the process according to this invention has the advantages that the amount of fins projecting from the forming metallic die is very small and light transmitting plates which are defective due to a poor vacuum tightness are rarely produced as compared with conventional processes. Especially, by reducing the surrounding pressure during the welding of the optical fiber bundles, and then increasing the pressure and maintaining the formed optical fibers at an elevated temperature ranging between the transition point and the softening point of the optical fiber glass, light transmitting plates having less cloudy spots and a high vacuum tightness can be produced with high yield. Thus, the process of this invention is suitable for producing light transmitting plates used for the face plate of a cathode ray tube.

While this invention has been described with reference to particular embodiments thereof, it will be understood that numerous modifications may be made by those skilled in the art without actually departing from the scope of the invention.

Therefore, the appended claims are intended to cover all such equivalent variations as coming within the true spirit and scope of the invention.

Table 1

| | Pressure in the Reduced Pressure Furnace (Torr) | Vacuum Tightness (Torr cc He/sec) | Number of Cloudy Spots (per 10 cm² area) |
| --- | --- | --- | --- |
| 1 | 1 | less than $1 \times 10^{-10}$ | 15 |
| 2 | $10^{-2}$ | less than $1 \times 10^{-10}$ | 8 |
| 3 | $10^{-4}$ | less than $1 \times 10^{-10}$ | 5 |
| 4 | $10^{-5}$ | less than $1 \times 10^{-10}$ | 3 |

EXAMPLE 4

The same type of optical fiber bundles as described in Example 1 were arranged in a metallic die having a cross section of 50 mm × 50 mm and a length of 70 mm, and heated in the reduced pressure furnace at a temperature ranging between 560°– 580°C. The pressure in the furnace was kept at $10^{-3}$ Torr and 10 to 500 kg/cm² of compression was applied to the heated optical fiber bundles to reduce the cross section to about 50% of the starting cross section. After releasing the compression, the pressure in the furnace was kept at 760 Torr, and the formed body was kept at a temperature ranging between 620°C and 680°C for some period of time. The formed body was then cooled slowly and

What is claimed is:

1. A process for producing a light transmitting plate comprising arranging optical fibers or bundles of optical fibers in a die, heating the optical fibers to a temperature ranging between the transition point of the optical fiber glass and the softening point of the optical fiber glass, welding the heated optical fibers together by applying compression under a reduced pressure, releasing the applied compression after the welding of the optical fibers, and maintaining the welded optical fibers at that temperature range at a pressure higher than the pressure during the heating period which is sufficient to cause the shrinkage of voids by the surface tension of the optical fibers.

2. The process of claim 1, including heating the optical fibers or bundles of optical fibers to a temperature slightly lower than the softening and deformation temperature of the optical fibers and degassing prior to said heating and compressing of the optical fibers at a temperature ranging from said transition point to said softening point.

* * * * *